Patented May 31, 1949

2,471,697

UNITED STATES PATENT OFFICE 2,471,697

PROCESS FOR REDUCING CARBONYL COMPOUNDS TO THEIR CORRESPONDING METHYLENE ANALOGUES

Huang Minlon, Cambridge, Mass., assignor to Merck & Co., Inc., Rahway, N. J., a corporation of New Jersey No Drawing. Application November 8, 1946, Serial No. 708,815

12 Claims. (Cl. 260—397.1)

This invention is concerned with novel processes generally applicable for reducing carbonyl groupings in organic compounds. More particularly it relates to an improved method for the commercial manufacture of compounds containing methylene groupings from the corresponding aldehydes and ketones.

One established general procedure applicable for the reduction of aldehydes and ketones to their methylene analogs is the Wolff-Kishner reduction. In the usual procedure of the Wolff-Kishner reduction the carbonyl compound is converted to the corresponding hydrazone, which is heated, at elevated temperature and under substantially anhydrous conditions, with a lower aliphatic alcoholic solution of the corresponding sodium alcoholate. One disadvantage of this method is that it is usually carried out in the presence of a volatile alcohol, and thus necessitates the use of high pressure equipment. In one modification of this procedure, which avoids the need for high pressure apparatus, the carbonyl compound is heated for a period of about 20 to 100 hrs., with 100% hydrazine hydrate and a solution prepared by dissolving a large amount of metallic sodium in an extremely large volume of a high-boiling solvent. The use of such large amounts of metallic sodium and high-boiling solvent, and the prolonged reaction periods required, are serious disadvantages to the commercial use of this process. Alternatively the carbonyl compound can first be converted to the corresponding hydrazone by conventional methods, as for example, by reaction with hydrazine hydrate in the presence of an aqueous acidic medium, and the hydrazone then heated with a solution of sodium alcoholate in an anhydrous high-boiling solvent. When this two-step procedure is employed, however, it is necessary to separate the hydrazone from the other components in substantially anhydrous form, prior to reacting said hydrazone with the solution of sodium alcoholate in the anhydrous high-boiling solvent. The yield obtainable by this two-step method has therefore generally been limited to about 60-70% of theory. These previous modifications of the Wolff-Kishner reaction are generally unsatisfactory for reducing certain compounds, as for example, the steroid ketones. Furthermore, they all have the disadvantage of requiring the use of costly reagents: metallic sodium of a sodium alcoholate; anhydrous hydrazine hydrate.

Applicant has discovered, surprisingly enough, that the carbonyl groupings in aldehydes and ketones can be reduced in a single operation and in yields up to 99.8% of theoretical, at the same time using a short reaction period, a small volume of solvent, inexpensive hydrazine solutions, and a relatively small proportion of alkali metal derivative. He has further discovered that alkali metal hydroxides or aqueous solutions thereof, can be used, as the alkaline agent, without loss in yield or purity of product, instead of the costly alkali metals or alkali metal alcoholates previously considered as essential in this type of reaction. These unexpected and commercially advantageous improvements are achieved by causing the carbonyl compound to react with an aqueous solution containing hydrazine hydrate and an alkali metal hydroxide in a high-boiling solvent, evaporating to remove low-boiling components, such as water and excess hydrazine hydrate, from the reaction solution until the boiling point of the solution reaches an elevated temperature of approximately 170–210° C., and heating the resulting solution at said elevated temperature to produce the desired reduced compound.

It is a preferred feature of this invention, as distinguished from previously known methods, that it is possible to utilize the readily available and inexpensive alkali metal hydroxides, such as sodium hydroxide, potassium hydroxide, and the like, instead of the costly alkali metal alcoholates, or the costly and hazardous sodium metal. If desired, however, alkali metal alcoholates can be employed but these necessarily react with the water present in the reaction mixture to form the corresponding alkali metal hydroxide. Although 100% hydrazine hydrate can be used in applicant's process it is a preferred feature of said process that the aqueous hydrazine hydrate (as for example the 85% technical material) can be used instead of the more costly anhydrous substances. The high-boiling solvent employed should boil, under atmospheric pressure, at a temperature of about 200° C. or higher, and should be a solvent for the alkali metal alcoholate or alkali metal hydroxide used. Applicant prefers to use alcoholic solvents, such as the polyethylene glycols as solvents in this reaction; it is presently preferred to employ diethylene glycol or triethylene glycol.

Although applicant ordinarily heats the aqueous reaction mixture under reflux for a period of approximately one hour prior to evaporating the low-boiling components therefrom, longer or shorter periods can be used and the reaction may frequently be carried out, if the reaction between the hydrazine and the carbonyl compound is rapid, by mixing the components and evaporating directly, whereby formation of the hydrazone and removal of volatile components takes place simultaneously. The time of heating following the evaporation of the low-boiling components varies somewhat dependent upon the compound being reduced but in no case has it been found necessary to employ a heating time in excess of about 3 to 4 hours. Some carbonyl compounds are completely reduced after a substantially shorter reaction period. The elevated temperature employed during the heating period following the distillation is dependent on the particular compound, but it is ordinarily preferred to employ a temperature of at least about 190° C., although lower temperatures can be utilized if desired, where the reduced product boils at a temperature below 190° C. When the reduced product is a low-boiling compound it can sometimes be distilled directly from the reaction mixture or else can be recovered by diluting the reaction mixture with water and extracting with an appropriate water-immiscible solvent such as a hydrocarbon solvent or a dialkyl ether. When the starting material or reaction product is very-low-boiling, or volatile with steam, a water separator can be used for removing the water instead of simple evaporation. It has often been found convenient to dilute the alkaline reaction mixture with water, and to recover the reduced compound by precipitation and filtration, or by extraction with a solvent.

Applicant has found that his novel process is generally applicable for reducing aliphatic, aromatic, araliphatic, and steroid ketones, aldehydes, and keto acids to the corresponding methylene analog. No compound within this general group tried by applicant has failed to give the desired reaction, and, in each case, a yield very near to that theoretically obtainable has resulted, although in certain cases the substituent groupings may themselves be hydrolyzed or reduced.

For example, aliphatic ketones, such as cyclohexanone, or aromatic ketones, such as benzophenone, and the like, are converted by applicant's procedure in yields of over 80% of theory to the corresponding hydrocarbon. The aromatic-aliphatic ketones, such as β-(p-phenoxybenzoyl)-propionic acid, γ-(p-phenoxybenzoyl)-butyric acid, and the like, are converted to the corresponding methylene products in yields of over 90% of theory.

When a carbonyl compound containing ester groupings, such as acylated hydroxyl or esterified carboxyl groupings, (as for example, acyloxy or carboalkoxy radicals), or ether groupings such as alkoxy, is reacted according to applicant's process, the carbonyl grouping is reduced to the corresponding methylene group and the ester or ether groups are generally hydrolyzed at the same time. Keto acids containing aryl ether groupings such as β-(p-phenoxybenzoyl)-propionic acid, γ-(p-phenoxybenzoyl)-butyric acid, and the like, are converted to the corresponding aroxy-substituted acid, wherein the keto radical has been reduced to a methylene grouping. When aldehyde or keto compounds containing an alkyl ether radical, as for example, vanillin, methyl vanillin, β-(3-methoxybenzoyl)-propionic acid, and the like, are reduced according to applicant's process the ether linkage is hydrolyzed to hydroxyl whereas the keto or aldehyde grouping is converted to the corresponding methylene radical.

The steroid ketones, such as dehydrochloric acid, methyl 3-benzoxy-12-keto-cholanate, and the like, can be reduced to the corresponding methylene compounds, often in nearly quantitative yield, independent of where the keto group is located. This is particularly surprising in view of the fact that it has been repeatedly observed that the steroid ketones and many other carbonyl compounds, when reduced by the usual Wolff-Kishner procedure, either do not yield the normal methylene compounds or give a mixture of methylene and carbinol compounds; the keto group of the steroids, especially the C₃-ketone group, yield chiefly the corresponding carbinol. (See Dutcher et al.: J. A. C. S., 61, 1922 (1939).)

The following examples illustrate methods of carrying out the presently invented process but it is to be understood that these examples are given by way of illustration and not of limitation.

*Example 1*

C₆H₅OC₆H₄COCH₂CH₂COOH→
C₆H₅OC₆H₄CH₂CH₂CH₂COOH

A mixture containing about 10 gm. of β-(p-phenoxybenzoyl)-propionic acid, about 5 gm. of sodium hydroxide, about 80 cc. of diethylene glycol and about 5 cc. of 85% hydrazine hydrate are heated under reflux for approximately one hour, and the low boiling components are then evaporated until the temperature of the solution reaches approximately 195° C. The resulting solution is then heated under reflux for an additional period of approximately 3 hours, the mixture is cooled, acidified, and extracted with ether. The ether extract is washed with water, dried and evaporated to produce approximately 9.1 g. of substantially pure γ-(p-phenoxyphenyl)-butyric acid; M. P. 67–68°; yield 96% of theory.

When diethylene glycol is substituted for triethylene glycol in the above process, the method employed is identical and no appreciable change in yield or quality of product results.

*Example 2*

A mixture containing about 500 g. of β-(p-phenoxybenzoyl)-propionic acid, about 350 gm. of potassium hydroxide, about 250 cc. of 85% hydrazine hydrate, and about 2500 cc. of triethylene glycol are heated under reflux for approximately one and one half hours and the low-boiling components are then evaporated until the temperature of the solution reaches approximately 195° C. The resulting solution is then heated under reflux for approximately 4 hours additional time, and the reaction mxture cooled and diluted with approximately 2.5 liters of water. This solution is then poured slowly into approximately 1.5 liters of 6 N hydrochloric acid and the light cream-colored product which precipitates is recovered filtration and dried to produce about 451 gm. of substantially pure γ-(p-phenoxyphenyl) butyric acid; M. P. 64–66° C.; yield 95% of theory.

When triethylene glycol is substituted for diethylene glycol in the above process, the method employed is identical and no appreciable change in yield or quality of product results.

*Example 3*

About 2.5 gm. of sodium are dissolved in about 70 cc. of diethylene glycol, and to the resulting solution of sodium diethylene glycolate is added about 10 gm. of the keto-acid, β-(p-phenoxybenzoyl)-propionic acid, and about 5 cc. of 85% hydrazine hydrate. The resulting solution is heated under reflux for approximately one hour, and the low boiling components are then evaporated until the temperature of the solution reaches approximately 195° C. The resulting solution is then heated under reflux for an additional period of approximately three hours, the mixture is cooled, acidified, and extracted with benzene. The benzene extract is washed with water, and dried and the benzene solution evaporated to produce approximately 9.2 gm. of substantially pure crystalline γ-(p-phenoxyphenyl)-butyric acid; M. P. 66–68° C.; yield 97% of theory. If desired this product can be further purified by recrystallization from benzene-ligroin (1:5) to produce approximately 8.63 gm. (91.3% of theory) of material melting 69–70° C.

*Example 4*

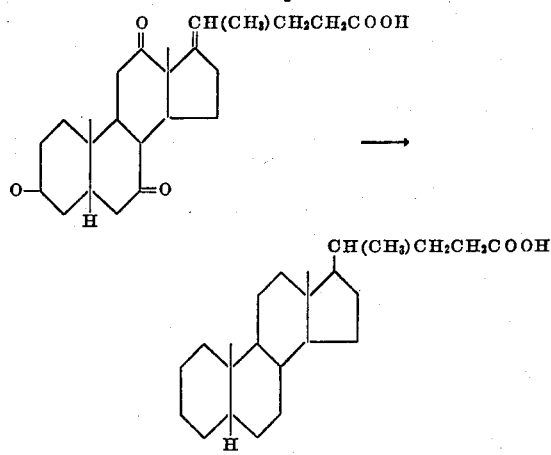

A mixture containing about 4.02 gm. of dehydrocholic acid, about 4 gm. of potassium hydroxide, about 3 cc. of 85% hydrazine hydrate and about 30 cc. of dethylene glycol, is heated under reflux for approximately 1 hour, and the low boiling components are then evaporated until the temperature of the solution reaches approximately 195° C. The resulting solution is then heated under reflux for an additional period of approximately 3 hours, the mixture is cooled, acidified, and extracted with ether. The ether solution is washed with water, dried, and the ether solution evaporated to produce approximately 3.55 gm. of crystalline substantially pure chlolanic acid; M. P. 162–164° C.; yield approximately 98.5% of theory. If desired, this material can be recrystallized from acetone to produce about 3.3 gm. (91.6% theory yield) of pure cholanic acid; M. P. 165–166° C., which shows no depression in melting point when admixed with a known sample of cholanic acid.

*Example 5*

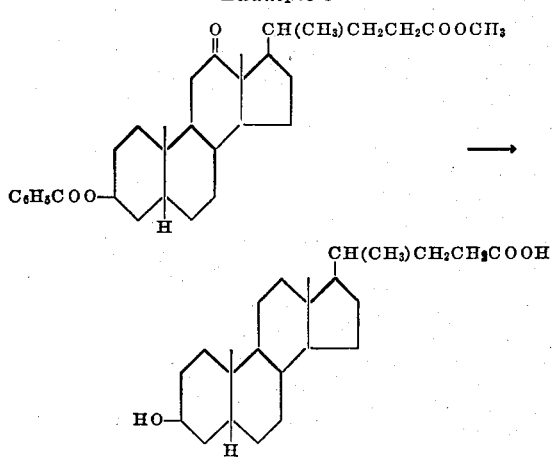

A mixture containing about 5.08 gm. of methyl 3-benzoxy-12-keto-cholanate (M. P. 121–122° C.), about 4.5 gm. potassium hydroxide, about 35 cc. of diethylene glycol and about 3 cc. of hydrazine hydrate is heated under reflux for approximately 1 hour, and the low boiling components are then evaporated until the temperature of the solution reaches approximately 195–200° C. The resulting solution is then heated under reflux for an additional period of approximately 3 hours, the mixture is cooled, acidified, whereupon the reduced product precipitates and is recovered by filtration, washed with hot water, and dried, to produce approximately 3.76 gm. of lithocholic acid; M. P. 181–183° C.; yield 99.8% of theory. This product can be recrystallized from acetone to produce approximately 3.44 gm. (91.3% of theory) pure lithocholic acid: M. P. 188–189°. This product shows no depression in melting point when admixed with a known sample of pure lithocholic acid.

*Example 6*

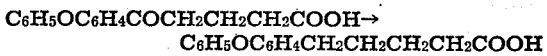

The starting material employed in this example may be prepared as follows: 54 gm. of diphenyl ether are reacted with an equimolecular quantity of glutaric anhydride in benzene solution containing aluminum chloride, at a temperature below about 10° C. The reaction product is steam distilled to remove benzene and the residual material is heated with an equeous solution of sodium carbonate and the precipitate of aluminum hydroxide is removed by filtration. The aqueous alkaline filtrate is then treated with an aqueous acid whereupon γ-(p-phenoxybenzoyl)-butyric acid precipitates and is recovered by filtration and dried to produce approximately 50 gm. of material melting at 101–105° C. This material can be purified by recrystallization from benzene-ligroin to produce about 48 gm. (84.5% of theory) of substantially pure γ-(p-phenoxybenzoyl)-butyric acid: M. P. 110–111° C.

About 10 gm. of γ-(p-phenoxybenzoyl)-butyric acid, about 5 gm. of sodium hydroxide, about 80 cc. of diethylene glycol and about 5 cc. of 85% hydrazine hydrate are heated under reflux for approximately 1 hour. The low boiling components are then evaporated until the temperature of the solution reaches approximately 195–200° C. and the resulting solution is heated under reflux for an additional 3 hour period. The reaction mixture is cooled, acidified, extracted with benzene and the benzene extract washed with water, and dried. Evaporation of the benzene extract produces approximately 9.1 gm. of δ-(p-phenoxyphenyl)-valeric acid: M. P. 60–62° C.; yield approximately 95.8% of theory. This product can be recrystallized from the ligroin-benzene to produce 8.1 gm. of substantially pure product: M. P. 66–67°; yield 85.3% of theory. Anal. calc'd. for $C_{17}H_{18}O_3$: C, 75.53; H, 6.71; found C, 75.46; H, 6.99.

*Example 7*

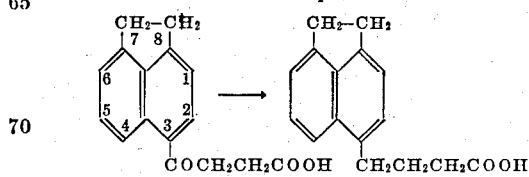

About 5.1 gm. of β-(3-acenaphthoyl)-propionic acid (which can be prepared as described in J. A. C. S., 54, 4374 (1932)) is mixed with about 3.5 gm. of potassium hydroxide, about 2.5 cc. of 85% hydrazine hydrate and about 25 cc. of triethylene glycol. The mixture is heated under reflux for approximately one and one half hours and the resulting solution is then distilled to evaporate the low-boiling components therefrom until the boiling temperature of the solution reaches approximately 195° C. This solution is then refluxed for an additional four hours, cooled, and diluted with approximately 25 cc. of water. The aqueous reaction solution is then poured slowly into approximately 15 cc. of 6-N hydrochloric acid whereupon the reduced product precipitates and is recovered by filtration and dried to produce approximately 4.81 gm. of γ-(3-acenaphthyl)-butyric acid; M. P. 140–143° C.; yield 99.8% of theory. This product can be purified by recrystallization, if desired, to produce an 81% of theory yield of substantially pure γ-(3-acenaphthyl) butyric acid: M. P. 147–148° C. Anal. calc'd. for $C_{16}H_{16}O_2$: C, 79.98; H, 6.71; found: C, 80.16; H, 7.19.

Example 8

About 2 gm. of β-3-methoxyphenylbenzoyl propionic acid is reduced employing potassium hydroxide, 85% hydrazine hydrate and triethylene glycol utilizing substantially the same procedure described in Example 2 above, and the acidified reaction mixture obtained in accordance with this process is extracted with ether. Upon remethylation of the ether extract, there is obtained approximately 1.67 gm. of γ-(3-methoxyphenyl-butyric acid: M. P. 40–42° C.; yield aproximately 89.3% of theory. When this product is recrystallized twice from ligroin, there is obtained approximately 1.2 gm. (64.5% yield) of substantially pure γ-(3-methoxyphenyl)-butyric acid; M. P. 46–47° C. Anal. calc'd. for $C_{11}H_{14}O_3$: C, 68.03; H, 7.27; found: C, 68.12; H, 7.03.

Example 9

A mixture containing about 18.2 gm. of benzophenone, about 7 gm. of sodium hydroxide, about 100 cc. of triethylene glycol, and about 10 cc. of 85% hydrazine hydrate are heated under reflux for approximately 1 hour and the low boiling components are then evaporated from the solution until the boiling temperature of said solution reaches approximately 195–200° C. The resulting solution is then heated under reflux for about 3 hours additional time and the reaction solution is cooled, acidified, and extracted with ether. The ether extract is washed with water and dried and evaporated and the residual material distilled over sodium under reduced pressure to produce approximately 14.0 gm. of diphenylmethane; B. P. 149° at 29 mm.; $n_D^{25}$ 1.5752; yield approximately 83.3% theory.

Example 10

A mixture containing about 40.2 gm. of propiophenone, about 40.0 gm. of potassium hydroxide, about 300 cc. of triethylene glycol, and about 30 cc. of 85% hydrazine hydrate is heated under reflux for approximately one hour, and the aqueous liquid is removed by means of a take-off adaptor until the temperature of the boiling solution reaches approximately 175–178° C. The resulting solution is heated under reflux for 3 hours additional time, the reaction mixture and aqueous distillate are combined and the mixture extracted with ether. The ether extract is then evaporated and the neutral organic fraction distilled over sodium to produce approximately 29.6 gm. of n-propylbenzene; B. P. 160–163° C.; $n_D^{25}$ 1.4908; yield approximately 82.2% of theory.

Example 11

A mixture containing about 39.2 gm. of cyclohexanone, about 40 gm. of potassium hydroxide, about 300 cc. of triethylene glycol, and about 40 cc. of 85% hydrazine hydrate, is heated under reflux for approximately 1 hour. The aqueous liquid is removed by means of a take-off adaptor until the temperature of the boiling solution reaches approximately 170° C. The resulting solution is heated under reflux for 3 hours additional time, and the reaction mixture distilled directly. The water-immiscible layer from this distillation is combined with the water-immiscible fraction obtained from the distillation following the one hour refluxing period. This material is washed with water until neutral, dried and distilled over sodium to produce approximately 27.0 gm. of cyclohexane; B. P. 80–81° C.; $n_D^{25}$ 1.4245 yield approximately 80.4% of theory.

Example 12

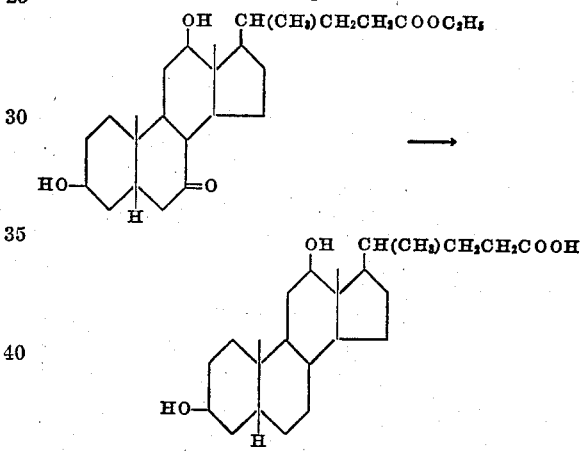

A mixture containing about 1.35 gm. of ethyl 3,12-dihydroxy-7-keto-cholanate (M. P. 159.5–160.5° C., prepared from cholic acid), about 1.5 gm. of potassium hydroxide, about 12 cc. of diethylene glycol and about 1.5 cc. of 85% hydrazine hydrate is heated under reflux for approximately one hour. The low-boiling components are then evaporated from this solution until the boiling temperature reaches approximately 195–200° C. and the resulting solution heated under reflux for approximately 3 hours additional time. The reaction solution is cooled, acidified and the product which precipitates is recovered by filtration, washed and the white solid obtained (1.16 gm.) is recrystallized from dilute acetic acid to produce approximately 0.88 gm. of substantially pure aceto-choleic acid: M. P. 135–136° C.; upon recrystallization of this product there is obtained approximately 0.78 gm. of product melting at 138–141° C., which shows no depression in melting point when admixed with a sample of aceto-choleic acid (M. P. 137–140° C.) prepared from a known sample of desoxycholic acid by recrystallization from acetic acid.

The aceto-choleic acid (138–141° C.) is converted into desoxycholic acid (M. P. 170–171° C.) substantially as described in "Chemistry of steroids," by Sobotka, p. 77. This product shows no depression in melting point when admixed with a known sample of desoxycholic acid (M. P. 168–170° C.).

Example 13

A mixture containing about 30.4 gm. of vanillin, about 30 gm. of potassium hydroxide, about 200 cc. of diethylene glycol and about 25 cc. of 85% hydrazine hydrate is heated under reflux for approximately 1 hour, the low boiling components are then evaporated until the boiling temperature of the solution is approximately 195–200° C., and the resulting solution is heated under reflux for approximately 3 hours additional time. The reaction solution is cooled, diluted with water and acidified and the resulting mixture extracted repeatedly (6 times) with ether. The ethereal solution is dried over "Drierite" and anhydrous sodium carbonate and the dried ether extract evaporated to produce approximately 26.8 gm. of product which boils at approximately 138–179° C. at 50 mm. pressure. When this material is re-methylated in alkaline solution employing dimethyl sulfate, the product extracted with ether and the ether extract evaporated, there is obtained approximately 26.23 gm. of residual oil. When this oil is distilled under reduced pressure, there is obtained approximately 23.52 gm. of pure 3,4-dimethyl-1-methyl-benzene; B. P. 133–135° C. at 50 mm.; yield approximately 77.4% theory; $n_D^{25} = 1.5258$.

Example 14

A mixture containing about 33.2 gm. of methyl vanillin, about 30 gm. of potassium hydroxide, about 200 cc. of diethylene glycol and about 25 cc. of 85% hydrazine hydrate is treated as described above. Upon remethylation of the reduced product there is obtained after distillation approximately 24.6 gm. of substantially pure 3,4-dimethoxy-1-methylbenzene; B. P. 122–124° C. at 27 mm., $n_D^{25} = 1.5259$; yield approximately 81% theory.

Modifications may be made in carrying out the present invention without departing from the spirit and scope thereof and the invention is to be limited only by the appended claims.

I claim:

1. The process of reducing a carbonyl compound selected from the class which consists of aldehydes and ketones to the corresponding methylene analog, which comprises reacting said carbonyl compound with an aqueous solution containing hydrazine hydrate, an alkali metal hydroxide, and a high-boiling solvent, evaporating low-boiling components from the reaction solution until the boiling point of said solution reaches an elevated temperature of at least about 170° C., and heating the resulting solution at said elevated temperature.

2. The process of reducing a carbonyl compound selected from the class which consists of aldehydes and ketones to the corresponding methylene analog, which comprises reacting said carbonyl compound with an aqueous solution containing hydrazine hydrate, an alkali metal hydroxide and a polyethylene glycol, distilling the reaction solution to evaporate low-boiling components until the boiling point of said solution reaches an elevated temperature of at least about 170° C., and heating the resulting solution at said elevated temperature.

3. The process of reducing a carbonyl compound selected from the class which consists of aldehydes and ketones to the corresponding methylene analog, which comprises reacting said carbonyl compound with an aqueous solution containing hydrazine hydrate, an alkali metal hydroxide and diethylene glycol, distilling the reaction solution to evaporate low-boiling components until the boiling point of said solution reaches an elevated temperature of at least about 170° C., and heating the resulting solution at said elevated temperature.

4. The process of reducing a carbonyl compound selected from the class which consists of aldehydes and ketones to the corresponding methylene analog, which comprises reacting said carbonyl compound with an aqueous solution containing hydrazine hydrate, an alkali metal hydroxide and triethylene glycol, distilling the reaction solution to evaporate low-boiling components until the boiling point of said solution reaches an elevated temperature of at least about 170° C., and heating the resulting solution at said elevated temperature.

5. The process of reducing a carbonyl compound containing a keto-grouping to the corresponding methylene analog, which comprises reacting said carbonyl compound with an aqueous solution containing hydrazine hydrate, an ankali metal hydroxide, and a polyethylene glycol, evaporating low-boiling components from the reaction solution until the boiling point of said solution reaches an elevated temperature of at least about 170° C., and heating the resulting solution at said elevated temperature.

6. The process of reducing a ketone of the formula: RCOR′, wherein R is an aliphatic substituent and R′ is an aromatic radical, to the corresponding methylene derivative which comprises reacting said ketone with an aqueous solution containing hydrazine hydrate, an alkali metal hydroxide, and a polyethylene glycol, evaporating low-boiling components from the reaction solution until the boiling point of said solution reaches an elevated temperature of at least about 170° C., and heating the resulting solution at said elevated temperature.

7. The process of reducing a carbonyl compound containing a cyclic ketone grouping to the corresponding methylene analog, which comprises reacting said carbonyl compound with an aqueous solution containing hydrazine hydrate, an alkali metal hydroxide, and a polyethylene glycol, evaporating low-boiling components from the reaction solution until the boiling point of said solution reaches an elevated temperature of at least about 170° C., and heating the resulting solution at said elevated temperature.

8. The process of reducing a keto-substituted carboxylic acid to the corresponding methylene analog, which comprises reacting said carbonyl compound with an aqueous solution containing hydrazine hydrate, an alkali metal hydroxide, and a polyethylene glycol, evaporating low-boiling components from the reaction solution until the boiling point of said solution reaches an elevated temperature of at least about 190° C., and heating the resulting solution at said elevated temperature.

9. The process of preparing γ-(p-phenoxyphenyl)-butyric acid, which comprises reacting β-(p-phenoxybenzoyl)-propionic acid with an aqueous solution containing hydrazine hydrate, potassium hydroxide, and triethylene glycol, evaporating low-boiling components from the reaction solution until the boiling point of said solution reaches an elevated temperature of at least about 190° C., and heating the resulting solution at said elevated temperature.

10. The process of preparing δ-(p-phenoxyphenyl)-valeric acid, which comprises reacting γ-(p-phenoxybenzoyl)-butyric acid with an aqueous solution containing hydrazine hydrate, sodium hydroxide and diethylene glycol, evaporating low-boiling components from the reaction solution until the boiling point of said solution reaches an elevated temperature of at least about 190° C., and heating the resulting solution at said elevated temperature.

11. The process of reducing a steroid ketone to the corresponding methylene derivative, which comprises reacting said steroid ketone with an aqueous solution containing hydrazine hydrate, an alkali metal hydroxide, and a polyethylene glycol, evaporating low-boiling components from the reaction solution until the boiling point of said solution reaches an elevated temperature of at least about 190° C., and heating the resulting solution at said elevated temperature.

12. The process of preparing desoxycholic acid which comprises reacting ethyl 3,12-dihydroxy-7-keto-cholanate with an aqueous solution containing hydrazine hydrate, potassium hydroxide, and diethylene glycol, evaporating low-boiling components from the reaction solution until the boiling point of said solution reaches an elevated temperature of at least about 190° C., and heating the resulting solution at said elevated temperature.

HUANG MINLON.

REFERENCES CITED

The following references are of record in the file of this patent:

Soffer: J. Am. Chem. Soc., vol. 67, pp. 1435–1436 (1945).